United States Patent Office 3,070,387
Patented Dec. 25, 1962

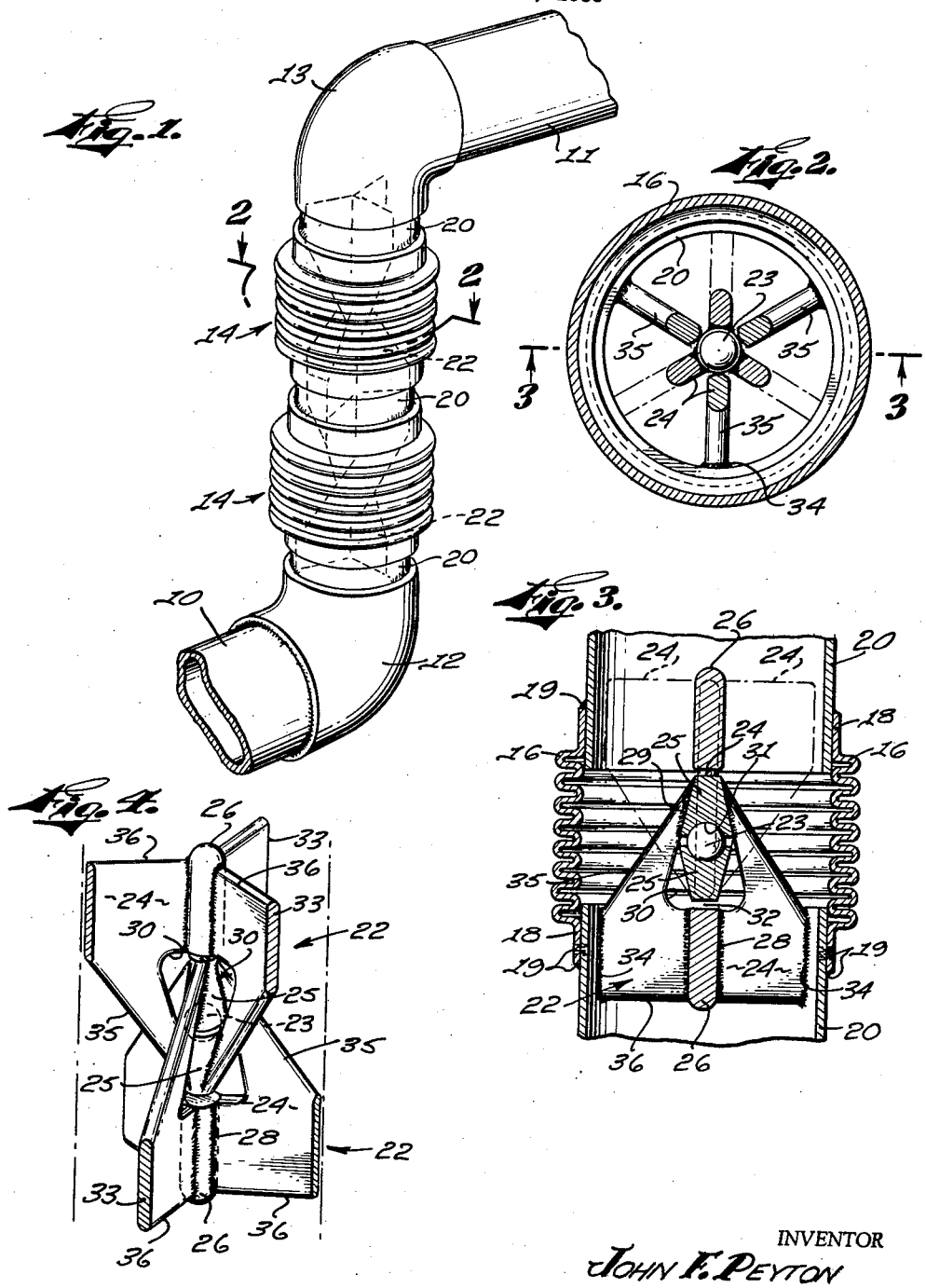

3,070,387
BELLOWS RESTRAINING DEVICE
John F. Peyton, 10518 7th Ave., Inglewood, Calif.
Filed Nov. 2, 1959, Ser. No. 850,453
7 Claims. (Cl. 285—114)

The present invention relates generally to a bellows unit for conduits, and particularly to an internally reinforced bellows unit.

Tubular metallic bellows are commonly used in conduits to accommodate relative movement between a pair of sections of conduit interconnected by the bellows. Within limits, the bellows is well adapted to withstand the forces imposed by the relative movement of the interconnected pair of sections by its expansion, contraction, and its bending abilities. However, in many conduit systems, and particularly in high pressure systems, the forces tending to elongate the bellows are very large. To prevent these loads imposing undue loads on the ducting or anchor points, a reinforcing means is employed to absorb the loads.

An object of my invention is to provide a restraining means for a flexible bellows to completely absorb the pneumatic or hydraulic load within the line, which in high pressure lines may amount to several tons.

Another object of the invention is to provide a bellows having an internal restraining means to absorb the loads induced by relative movement of the interconnected sections, while allowing the bellows to deform freely in response to the relative movement.

Yet another object of the invention is to provide an internally restrained bellows particularly adapted for airborne applications. In this connection the loads are absorbed internally within the bellows, rather than being absorbed through the medium of external supporting anchors, and a much lighter weight piping or ducting system can be employed.

Yet another object of the invention is to provide an internally restrained bellows adapted to minimize reduction in internal cross-sectional area of the restraining means so as to minimize pressure drops of the fluid passing through the system.

A further object of the invention is to provide an internal restraining means for a bellows adapted to allow bending in any direction, and further adapted to absorb the system loads equally well in any direction of bending.

A still further object of the invention is to provide an internally restrained bellows unit employing a minimum number of parts of minimum cross-sectional area but of great strength and capable of enduring many bending cycles to achieve a long service life.

These and other objects and advantages of the invention will be apparent from the following description when taken in connection with the annexed drawing in which:

FIGURE 1 is a perspective view of a portion of a conduit system including internally reinforced bellows units embodying my invention;

FIGURE 2 is a cross-sectional view taken on the line 2—2 of FIGURE 1;

FIGURE 3 is an axial sectional view taken on the line 3—3 of FIGURE 2; and

FIGURE 4 is a perspective view of the internal bellows restraining means.

In general the illustrated presently preferred embodiment of my invention comprises a tubular metal bellows having a pair of collars affixed to its opposite ends, an internal strut assembly affixed to each of the collars, the pair of assemblies being interlaced within the bellows and having a common swivel seat on a central ball. The collars, in turn, are fastened to the pair of conduit sections to be intercommunicated and move along with movement of the corresponding conduit sections. The swivelly interconnected strut assemblies permit bending of the bellows in any direction, so that there is no need to angularly orient the bellows unit with respect to the conduit ends in a predetermined relationship. Opposed relative movement of the conduit sections thus induces bending of the bellows, but under the restraint of the interlaced strut assemblies, the extent to which the conduit ends can separate or move together is limited, to correspondingly limit expansion and contraction of the bellows, preventing the transfer of pneumatic or hydraulic forces to external supports, and preventing column loading of the duct.

FIGURE 1 shows a dog leg portion of a high pressure conduit system, in which a pair of internally restrained bellows units of my invention are mounted. The system includes a pair of offset conduits 10 and 11 terminating in elbows 12 and 13. The confronting ends of the elbows are intercommunicated by a pair of identical bellows units, each designated generally as 14. The system is adapted to carry high pressure fluids, as, for example, a liquid fuel or highly compressed air. A pair of the bellows units 14 is frequently used in dog legs of this type, but it will be understood that the bellows units can be used singly and in other environments than dog legs.

More particularly each unit 14 comprises a tubular metallic bellows 16, each of whose opposite ends is cylindrically shaped and sleeved over an end of a collar 20 and permanently secured thereto by a continuous weld 19, extending circumferentially around the assembly. For simplicity of illustration the material of the bellows 16 is illustrated as comprising a single thickness of a sheet metal material but for high pressure systems, the bellows actually comprises a lamination of very many layers of convoluted bellows.

The collars 20 may comprise long lengths or sections of the conduit material of a relatively short axial length and, in the system illustrated are adapted for slipping within an end of the elbows 13. In this system, the collar 20 between the pair of bellows 16 serves as an anchor for the internal restraining means in both bellows units 14.

The restraining means for each bellows 16 takes the form of a pair of identical strut assemblies 22 that are interlaced with one another and adapted to seat a ball 23, in such a way that the strut assemblies are swivelly related. Each strut assembly comprises a plurality of struts 24, a nose piece 25 and a tail piece 26. The nose piece 25 of each strut assembly 22 is confined within an aperture provided in the other strut assembly 22 so that the nose pieces 25 are disposed adjacent one another and have their confronting ends adapted to seat the ball 23.

More specifically the nose piece 25 and tail piece 26 of each assembly are held in coaxially assembled relationship by three equally circumferentially spaced apart struts 24. The tail piece 26 is of cylindrical configuration, and each of the struts 24 along its radially inner edge is affixed to the tail piece by welding 28. The nose piece 25 is of frusto-conical configuration and a portion of the radially innermost edge of each strut 24 surrounding the nose piece is complementarily configured to receive the nose piece, which is held in place on the struts by welding 29.

The inner edges of the struts 24 in the distance between the nose piece 25 and the tail piece are relieved as indicated at 30. At the ends of the pair of nose pieces 25 which confront one another, i.e. at their larger diameter ends, each nose piece is provided with a ball seat 31 adapted to receive the ball 23, which is retained between the confronting ball seats. The pair of strut assemblies is thus interlaced in such a manner that the nose piece 25 of one is received and can pivot within the relieved spaces 30 of the other assembly. It will be observed that there is a clearance space, indicated at 32, between the confronting ends of the tail piece 28 of one assembly and the small diameter end of the nose piece 25 of the other assembly 22. This space permits partial collapsing of the bellows 16, but not to such an extent as to permit the ball 23 to escape from between the seats 31.

The struts 24 have outer edges 33 adapted to be received within a collar 20 and secured therein, as by welding 34, so that each strut assembly 22 is held in coaxial relationship to its supporting collar. A tapered edge 35 of each strut 24 extends from the outer edge 33 to the apex of the nose piece 25. It will be observed that this edge is rounded so as to be streamlined, and this is also true of the axially oppositely facing edge 36 of each strut. These faired edges avoid creation of undue turbulence of the fluids flowing through the system and for the same purpose the reduced diameter ends of the frusto-conical nose pieces 25 are substantially the same diameter as the coaxially aligned tail pieces 28. It will also be noted that the outermost ends of the cylindrical tail pieces 26 are rounded and are thus also adapted to avoid creation of turbulence.

These strut assemblies are highly efficient in allowing the passage of fluids with a minimum pressure drop, because their cross-sectional area is substantially constant throughout the length of the unit and this cross-sectional area is relatively small. The volume of space occupied by the pair of tail pieces 26, pair of nose pieces 25 and ball 23 is of substantially uniform cross-sectional area from one end to the other of the assembly, being only slightly enlarged at the major diameter ends of the nose pieces. Within each collar 20 the total cross-sectional area occupied by the strut assembly comprises the axially facing area of the three struts 24 and a tail piece 26. Within the bellows 16 the total cross-sectional area occupied by the strut assemblies comprises portions of six struts 24, the pair of nose pieces 25 and the ball 23. However, the fact that six rather than three struts are disposed within the bellows 16 does not mean an increase in the total cross-sectional resistance area inasmuch as the portions of the struts 24 within the bellows have the tapered edges 35. Accordingly, if a transverse section be taken at any point along the axial extent of the bellows 16 the total cross-sectional resistance area offered by the six struts 25 is substantially the same as the total cross-sectional resistance area of only three of the struts. This will be apparent from an examination of FIGURE 2 by comparing the cross-sectional area of the six struts with the total frontal or resistance area of three struts.

The ball 23 is highly efficient for maximizing the load capacity of the restraining means with a minimum cross-sectional area and weight. This is due to the relatively large area of contact provided by the ball on the two ball seats 31. This arrangement is also of importance in providing a very long service life for the bellows unit inasmuch as the ball mechanism is adapted to efficiently absorb shock loads and minimizes wear on the ball and its seats. As the unit 14 bends, the ball 23 is gradually moved to a new position in its seats and this movement of the ball to new positions ensues with each new cycle of bending. Accordingly, the ball wears evenly in its seats 31. Another advantage derived from the use of the swivel ball is the fact that the two strut assemblies and their collars 20 or sections of conduit can move equally well in any direction, i.e. bending in any direction is permitted and loads are equally well absorbed in any direction of bending.

The location of the ball 23 on the center line of the duct system permits the bellows 16 to bend immediately in response to opposite relative movement of the connected sections of conduit. The forces in the system are thus absorbed by the restraining means, as they should be, rather than being transmitted to the bellows 16. Since the swivelly interlaced strut assemblies have a pivot on the center line of the duct, any opposite movement of the interconnected conduit sections is immediately reflected in bending of the strut assemblies relative to one another. Small bending moments are thus immediately reflected in swivelling movement of the pair of strut assemblies whereas in externally restrained devices a couple is necessary to cause bending of the bellows. Accordingly, in the externally restrained devices the force required for effecting bending of the bellows is greatly increased in proportion to the distance between the center line of the duct and an exterior axis of the couple.

In the assembly of a bellows unit each strut assembly first has all of its parts welded together with the exception that the tail piece 26 of the assemblies is left out. The two partially completed strut assemblies are then interlaced with the ball 23 being placed between its seats 31. Thereafter, the tail pieces 26 are put into place and during welding of the tail pieces to the struts 24 the hardened ball 23, which is protectively encased in its seats, is very greatly protected from the heat of the welding operation so that its wear characteristics are not adversely affected. Thereafter, the interlaced or joined strut assemblies are placed within the collars 20 and the struts 24 joined to the collars by the welds 34.

Although I have shown and described but a single embodiment of my invention several variations thereof will occur to those skilled in the art. Accordingly, it is to be understood that I do not wish to be limited to the exact details of construction set forth above but only by the spirit and scope of the following claims.

I claim:

1. In a bellow unit the combination comprising: a tubular bellows; a pair of tubular members coaxially affixed to opposite ends of said bellows; a plurality of spaced struts interiorly affixed to each of said tubular members and each of which extends radially inwardly into said bellows, the struts of each tubular member having a ball seat portion having a seat facing the tubular member on which said struts are mounted and opening towards the ball seat portion of the struts of the other tubular member; and a ball retained by said ball seat portions.

2. In a bellows unit the combination comprising: a tubular bellows; a pair of tubular members coaxially affixed to opposite ends of said bellows; a rigid strut assembly affixed within each of said tubular members, each assembly comprising a plurality of struts extending radially inwardly from said tubular member and projecting into said bellows, the projecting ends of said struts rigidly supporting a ball seat member having a ball seat confronting the ball seat of the other assembly and facing the tubular member which supports its own assembly, said seats being coincident with the intersection of the projected axes of said tubular members; and a ball retained by said seats.

3. A bellows unit comprising: a tubular bellows; a pair of tubular members coaxially affixed to opposite ends of said bellows; a pair of rigid strut assemblies each comprising a nose piece coaxially aligned with and spaced apart from a tail piece, said pieces rigidly supporting opposite ends of a plurality of struts that extend radially outwardly from said nose piece and tail piece to be rigidly affixed along radially outermost edges thereof to the inside of one of said tubular members, said struts supporting said nose piece and tail piece in coaxial alignment with said tubular member with said nose piece disposed within said bellows, said pair of assemblies being arranged with the nose piece of one disposed within the space between the nose piece and tail piece of the other assembly, the confronting ends of said pair of nose pieces having ball seats formed therein; and a ball held between said seats that swivelly limits opposed outward movement of said tubular members, said tail pieces limiting opposite inward movement of said tubular members by engaging said nose pieces.

4. A bellows unit comprising: a tubular bellows; a pair of tubular members coaxially affixed to opposite ends of said bellows; a pair of rigid strut assemblies each comprising a nose piece coaxially aligned with and spaced apart from a tail piece, said nose piece on the end thereof facing said tail piece being formed with a ball seat, said nose piece and tail piece being rigidly affixed to opposite ends of radially innermost edges of a plurality of struts that extend radially outwardly from said nose piece and tail piece in radial planes, each of said struts along its radially outermost edge being rigidly affixed to the interior of one of said tubular members, said struts supporting said nose piece and tail piece in coaxial alignment with said tubular member with said nose piece disposed within said bellows, said pair of assemblies being arranged with the nose piece of one disposed between the tail piece and nose piece of the other assembly with said ball seats in confronting relationship; and a ball in said seats that swively limits movement apart of said assemblies and tubular member, the nose piece and tail piece of one assembly limiting axial movement therebetween of the nose piece of the other assembly within predetermined limits to limit movement towards one another of said pair of assemblies and pair of tubular members.

5. In a bellows unit, the combination comprising: a tubular bellows; a pair of tubular members coaxially affixed to opposite ends of said bellows; a plurality of spaced struts interiorly affixed to each of said tubular members and each of which extends inwardly into said bellows, the struts of one of said tubular members having a portion formed with a swivel seat facing the tubular member on which the struts of said one tubular member are mounted, said struts of both tubular members being interlaced with one another and having confronting means including said swivel seat for swivelly interengaging said struts of both tubular members and arranged to swivelly limit separating movement of said tubular members, said means including a surface in swivel engagement with said seat, with said surface and said swivel seat cooperating to define a universal connection enabling relative bending movement between said tubular members in any lateral direction.

6. A bellows unit comprising: a tubular bellows; a pair of tubular members coaxially affixed to opposite ends of said bellows; and a pair of fluid-passing, rigid means, each of which means is internally affixed to one of said pair of members, said pair of means being interlaced with one another to have confronting portions; and swivel means, including said confronting portions, to oppose separating movement of said tubular members in axial directions when engaged, said swivel means including a swivel seat surface on the confronting portion of one of said rigid means and, also, including a surface adapted for swivelling engagement with said seat surface, at least one of said surfaces being substantially semi-spherical in configuration.

7. A bellows unit comprising: a tubular bellows; a pair of tubular members coaxially affixed to opposite ends of said bellows; a rigid support internally affixed in each of said members, said supports being adapted for axially passing a fluid through said unit, said supports having interlaced confronting portions within said bellows; and swivel means between and including said confronting portions of said supports to swivelly limit separating movement of said tubular members in axial directions, said means comprising a ball seat formed on one of said portions and, also, including a substantially semi-spherical surface for swivelly engaging said seat.

References Cited in the file of this patent

UNITED STATES PATENTS

| | | |
|---|---|---|
| 401,706 | Legat | Apr. 16, 1889 |
| 2,420,053 | Muller | May 6, 1947 |
| 2,473,618 | Stillwagon | June 21, 1949 |

FOREIGN PATENTS

| | | |
|---|---|---|
| 807,336 | Great Britain | Jan. 14, 1959 |
| 816,157 | Great Britain | July 8, 1959 |